L. B. HORNBECK.
ELECTRIC SWITCH BOX.
APPLICATION FILED NOV. 14, 1910.

1,069,425.

Patented Aug. 5, 1913.

WITNESSES

INVENTOR
LLOYD B. HORNBECK

UNITED STATES PATENT OFFICE.

LLOYD B. HORNBECK, OF MINNEAPOLIS, MINNESOTA.

ELECTRIC SWITCH-BOX.

1,069,425.

Specification of Letters Patent.

Patented Aug. 5, 1913.

Application filed November 14, 1910. Serial No. 592,391.

*To all whom it may concern:*

Be it known that I, LLOYD B. HORNBECK, of Minneapolis, Hennepin county, Minnesota, have invented certain new and useful Improvements in Electric Switch-Boxes, of which the following is a specification.

The object of my invention is to provide a switch box which can be easily adjusted at any desired position in the wall to accommodate it to the electric light cables and the thickness of the wall or partition.

A further object is to provide a switch box having a cover capable of adjustment on the box to adapt it for use with a vertically arranged push button plate or with one that is horizontally arranged.

The invention consists generally in various constructions and combinations, all as hereinafter described and particularly pointed out in the claim.

Figure 1:
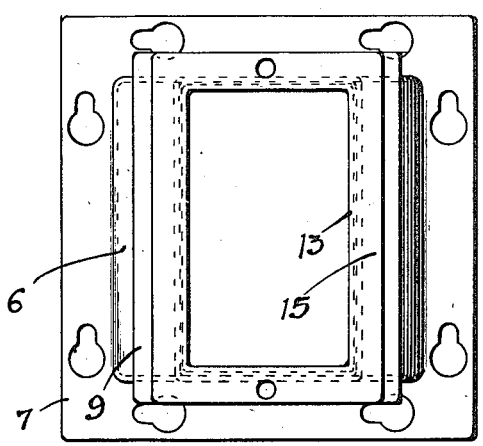
Figure 2:
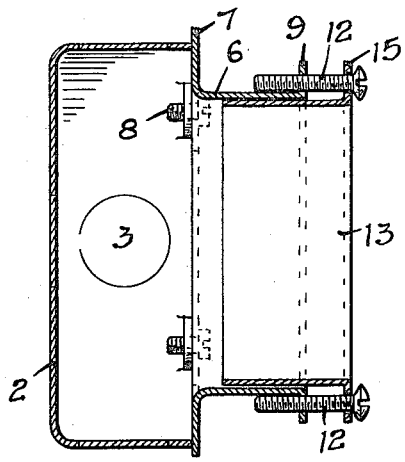
Figure 3:
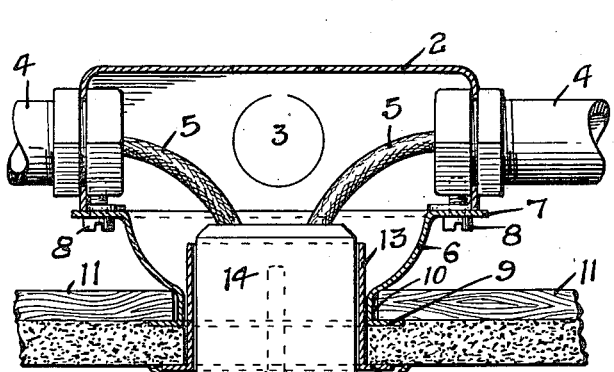
Figure 5:
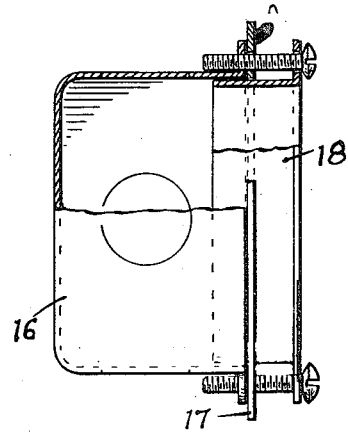
Figure 4:
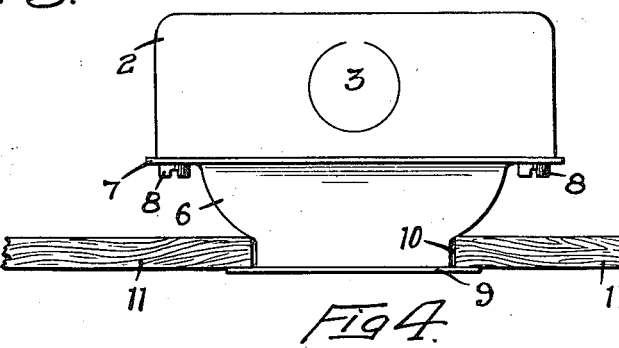

In the accompanying drawings forming part of this specification, Figure 1 is a front view of a switch box embodying my invention, Fig. 2 is a transverse, sectional view of the same, Fig. 3 is a sectional view showing the box mounted in the wall, Fig. 4 is an outside view, Fig. 5 is a detail sectional view of a modified construction.

In the drawings, 2 represents a switch box having the usual removable disks 3 covering holes through which pipes 4 are inserted to contain the cables 5. A cover 6 has a flange 7 secured to the box 2 by screws 8, the walls of said cover converging, as indicated in Fig. 3, and forming with the flange 9 at the outer end of said cover a recess 10 to receive the ends of the lath 11. This cover is capable of adjustment on the box to adapt it for a vertical or horizontal arrangement of the push button plate. Generally the box and cover will be arranged as in Fig. 1, but the position of the cover can be changed so that the plate will extend horizontally. The ends of the lath are preferably held in place between the converging walls of the cover and the flange 9, against which walls the ends of the lath are seated. The box is sometimes set into the wall or partition a considerable distance, so that an ordinary cover would not extend to the surface of the plastering. I prefer to provide, therefore, a telescoping section 13 fitting within the cover 6 and capable of sliding back and forth therein and having a recess wherein the push button switch 14, of ordinary construction, is inserted. This telescoping section has a flanged outer portion 15 to rest upon the plastering or plaster, being held between the flanges of the cover and the telescoping section. Evidently, this telescoping section can be moved in and out to adapt it to the thickness of the plaster and to the position of the box in the wall. The telescoping section is made adjustable by means of the screws 12 which pass through the flanges 15 and 9.

In Fig. 5 I have shown a modified construction, which consists in providing a box 16 having a removable flange 17 and a telescoping part 18 corresponding to the one described, and adapted to be clamped to the lath and plaster by screws in the same manner as shown in Figs. 2 and 3.

The device may be made in any suitable size according to the number of switches to be used, and the attachments herein shown may apply to any style of switch box in general use.

I claim as my invention:—

The combination, with a wall switch box, of a cover adapted to fit over the open face of said box and having a flanged inner end and means securing it to the walls of said box, said cover having converging side and end walls terminating at their outer edges in an outwardly extending flange, a seat being formed between said flange and the walls of said cover to receive the lath, the ends of the lath being concealed by said flange, said cover having an opening therein encircled by said last named flange, a flanged sleeve fitting within said opening, adjusting screws passing through the outer flange of said cover and the flange of said sleeve for moving said sleeve back and forth in said cover opening, the space between the outer flange of said cover and the flange of said sleeve being adapted to receive the plastering, and the adjustment of said sleeve adapting it to plastering of different thickness, and a switch fitting within said sleeve and having an outer face plate covering and concealing the flange of said sleeve, substantially as described.

In witness whereof, I have hereunto set my hand this 4th day of November, 1910.

LLOYD B. HORNBECK.

Witnesses:
GENEVIEVE E. SORENSEN,
EDWARD A. PAUL.